(12) United States Patent
Meyers

(10) Patent No.: US 10,120,785 B2
(45) Date of Patent: Nov. 6, 2018

(54) AUTOMATIC GENERATION OF DATA COUPLING AND CONTROL COUPLING TEST CONDITIONS

(71) Applicant: Rosemount Aerospace Inc., Burnsville, MN (US)

(72) Inventor: Scott C. Meyers, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 15/331,259

(22) Filed: Oct. 21, 2016

(65) Prior Publication Data

US 2018/0113796 A1    Apr. 26, 2018

(51) Int. Cl.
| | |
|---|---|
| G06F 9/44 | (2018.01) |
| G06F 11/36 | (2006.01) |
| G06F 8/20 | (2018.01) |
| G06F 8/35 | (2018.01) |

(52) U.S. Cl.
CPC ............ G06F 11/3684 (2013.01); G06F 8/20 (2013.01); G06F 8/35 (2013.01); G06F 11/36 (2013.01); G06F 11/3608 (2013.01); G06F 11/3612 (2013.01); G06F 11/3664 (2013.01); G06F 11/3668 (2013.01); G06F 11/3672 (2013.01); G06F 11/3688 (2013.01); G06F 11/3692 (2013.01)

(58) Field of Classification Search
None
See application file for complete search history.

(56) References Cited

U.S. PATENT DOCUMENTS

| | | | |
|---|---|---|---|
| 6,922,821 B1* | 7/2005 | Nemecek | G06F 11/261 703/13 |
| 7,644,334 B2* | 1/2010 | Hickman | G01R 31/31704 714/739 |
| 8,423,879 B2 | 4/2013 | Bhatt et al. | |
| 8,612,938 B2 | 12/2013 | Prasad et al. | |
| 9,020,796 B2 | 4/2015 | Amalfitano et al. | |
| 2008/0216053 A1* | 9/2008 | Sluiman | G06F 11/28 717/124 |
| 2016/0170864 A1* | 6/2016 | Li | G06F 11/3684 717/126 |

FOREIGN PATENT DOCUMENTS

| | | |
|---|---|---|
| CN | 104978275 A | 10/2015 |
| CN | 105653443 A | 6/2016 |
| CN | 105653445 A | 6/2016 |

\* cited by examiner

*Primary Examiner* — Lewis A Bullock, Jr.
*Assistant Examiner* — Mark A Gooray
(74) *Attorney, Agent, or Firm* — Kinney & Lange, P.A.

(57) ABSTRACT

An automatic test generator (ATG) parses a computer-executable design model of operational software of an aircraft electronic device to identify design model data coupling and design model control coupling between functional modules of the design model. The ATG generates a plurality of test conditions configured to test whether the operational software of the aircraft electronic device satisfies the design model data coupling and the design model control coupling. A test procedure that implements the plurality of test conditions is generated. The test procedure is executed on the operational software of the aircraft electronic device. An indication of whether the operational software of the aircraft electronic device satisfies each respective one of the plurality of test conditions is output.

14 Claims, 4 Drawing Sheets

AUTOMATIC GENERATION OF DATA COUPLING AND CONTROL COUPLING TEST CONDITIONS

BACKGROUND

Modern aircraft systems, such as aircraft air data systems, ice detection systems, auto flight control systems, flight management systems, and other aircraft systems often utilize electronic devices that execute computer-readable instructions in the form of software that controls operation of the device and/or system. For instance, aircraft air data systems typically utilize an air data computer that executes operational software to determine air data parameters, such as aircraft airspeed, altitude, angle of attack, or other air data parameters, and transmits such parameters to consuming systems.

Software verification and testing is important to ensure that the software operates according to an approved design. Indeed, airworthiness certification that is typically managed by governmental certification authorities (e.g., the United States Federal Aviation Administration, the European Aviation Safety Agency, Transport Canada, or other certification authorities) often require that operational software be subjected to a series of rigorous tests to ensure that the software accurately reflects an approved set of design requirements. Such tests are designed to meet specified objectives, such as structural coverage objectives (e.g., Modified Condition Decision Coverage). As an example, the document DO-178C, entitled "Software Considerations in Airborne Systems and Equipment Certification" published by the Radio Technical Commission for Aeronautics (RTCA) is the primary means of obtaining approval of software used in civil aviation products in the United States. DO-178C sets forth, among others, an objective that test coverage of software structure data coupling and control coupling is achieved. Related document DO-331, entitled "Model-Based Development and Verification Supplement to DO-178C and DO-278A," sets forth explanatory text and software life cycle data that should be addressed when model-based development and verification are used as part of the software life cycle.

To satisfy the objectives of DO-178C in view of DO-331 in a model-based development software life cycle, test conditions are typically written and executed to verify that data coupling and control coupling as described in the design model is achieved by the operational software. The process of identifying data and control coupling within the executable software, as well as confirming that there exist test conditions to verify the corresponding coupling, is typically manual in nature (i.e., performed by a software engineer or other technician). The manual process is time consuming, expensive, and can be prone to human errors in both identifying the coupling and confirming the test coverage of the corresponding test cases.

SUMMARY

In one example, a method includes parsing, by an automatic test generator (ATG), a computer-executable design model of operational software of an aircraft electronic device to identify design model data coupling and design model control coupling between functional modules of the design model. The method further includes generating, by the ATG, a plurality of test conditions configured to test whether the operational software of the aircraft electronic device satisfies the design model data coupling and the design model control coupling, and generating, by the ATG, a test procedure that implements the plurality of test conditions. The method further includes executing the test procedure on the operational software of the aircraft electronic device, and outputting, for each of the plurality of test conditions, an indication of whether the operational software of the aircraft electronic device satisfies the respective test condition.

In another example, a system includes an aircraft electronic device, a computing device, and a test device in communication with the aircraft electronic device and the computing device. The computing device includes at least one processor and computer-readable memory. The computer-readable memory of the computing device is encoded with instructions that, when executed by the at least one processor, cause the computing device to execute an automatic test generator (ATG) that is configured to parse a computer-executable design model of operational software of the aircraft electronic device to identify design model data coupling and design model control coupling between functional modules of the design model. The ATG is further configured to generate a plurality of test conditions configured to test whether the operational software of the aircraft electronic device satisfies the design model data coupling and the design model control coupling, and generate a test procedure that implements the plurality of test conditions. The test device is configured to receive the test procedure from the computing device, execute the test procedure on the operational software of the aircraft electronic device, and output, for each of the plurality of test conditions, an indication of whether the operational software of the electronic device satisfies the respective test condition.

In another example, a system includes one or more processors and computer-readable memory. The computer-readable memory is encoded with instructions that, when executed by the at least one processor, cause the system to execute an automatic test generator (ATG) configured to: parse a computer-executable design model of operational software of an aircraft electronic device to identify design model data coupling and design model control coupling between functional modules of the design model; generate a plurality of test conditions configured to test whether the operational software of the aircraft electronic device satisfies the design model data coupling and the design model control coupling; and execute a test procedure that implements the plurality of test conditions on the operational software of the aircraft electronic device.

DETAILED DESCRIPTION

As described herein, an automatic test generator (ATG) parses a computer-executable design model of operational software of an aircraft electronic device to identify data and control coupling between functional modules of the design model. The ATG generates test conditions that are executed against the operational software to determine whether data and control coupling of the design model matches data and control coupling of the operational software. As such, techniques of this disclosure can help to decrease both the time and expense associated with such verification operations, as well as decrease the incidence of human error during the verification process.

Figure 1:
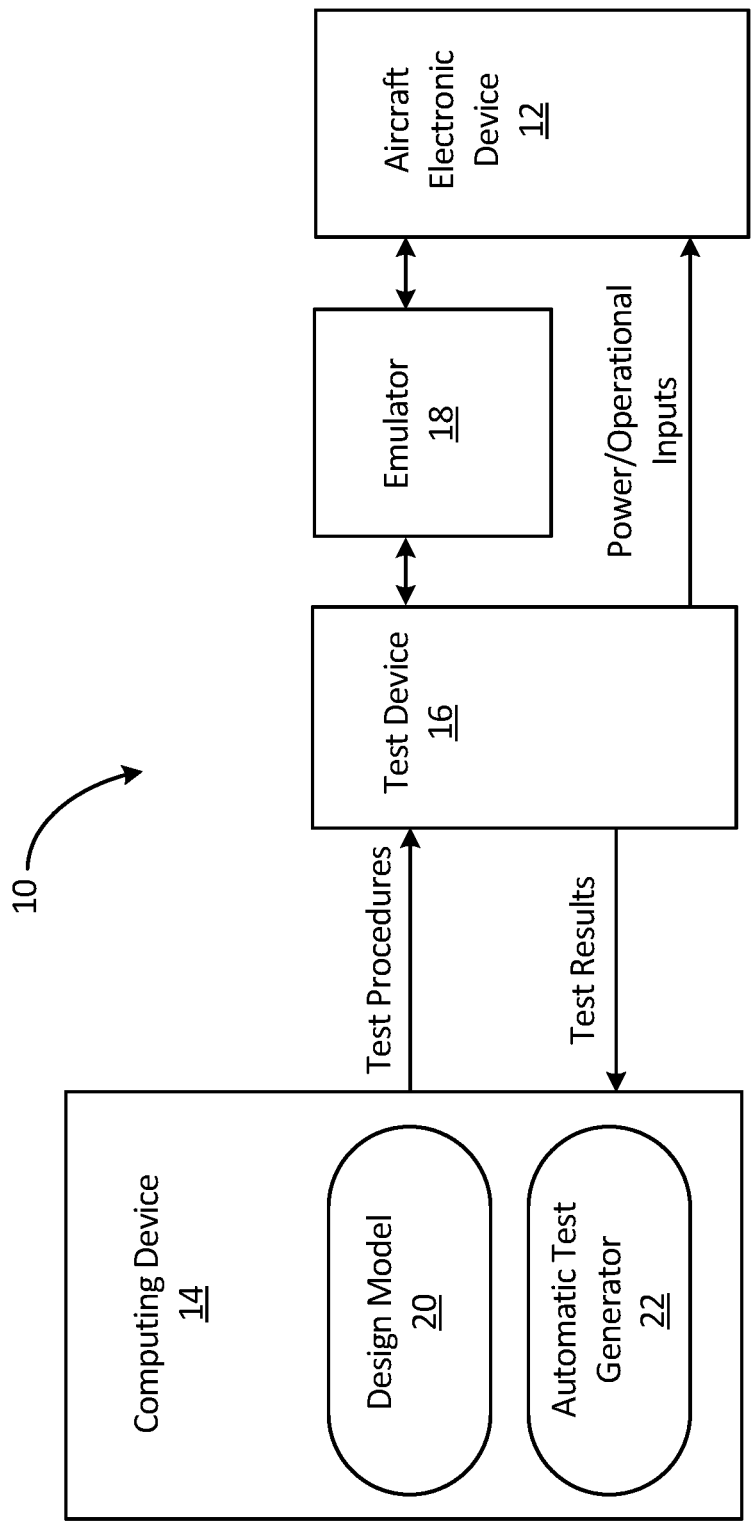
FIG. 1 is a schematic block diagram of an example system that generates test conditions configured to test whether operational software of an aircraft electronic device satisfies design model data coupling and design model control coupling.

FIG. 1 is a schematic block diagram of system 10 that generates test conditions configured to test whether operational software of aircraft electronic device 12 satisfies design model data coupling and design model control coupling. As illustrated in FIG. 1, system 10 includes aircraft electronic device 12, computing device 14, test device 16, and emulator 18. Computing device 14 includes design model 20 and automatic test generator (ATG) 22.

System 10 can be implemented within a testing lab or other ground-based facility, such that aircraft electronic device 12 need not be installed on an aircraft during the testing process. In operation, ATG 22, executing on computing device 14, identifies data coupling and control coupling between functional modules of design model 20 and automatically generates test cases and one or more test procedures configured to test whether operational software of aircraft electronic device 12 satisfies the data coupling and control coupling, as is further described below.

Aircraft electronic device 12 can be any electronic device configured for use on an aircraft and having one or more processors and computer-readable memory capable of executing operational software that controls operation of aircraft electronic device 12. Examples of aircraft electronic device 12 include, but are not limited to, air data computers, icing condition detectors, flight management computers, auto flight control computers, data concentrator units, or other electronic devices. Computing device 14 includes one or more processors and computer-readable memory encoded with instructions that, when executed by the one or more processors, cause computing device 14 to implement ATG 22 to automatically generate test conditions based on identified data coupling and control coupling between functional modules of design model 20. Examples of computing device 14 include laptop computers, desktop computers, servers, mainframes, mobile phones (including smartphones), tablet computers, personal digital assistants (PDAs), or other computing devices.

Test device 16 includes hardware and software components configured to implement test procedures (generated by ATG 22 and received from, e.g., computing device 14) on operational software of aircraft electronic device 12. For instance, test device 16 can supply electrical power to aircraft electronic device 12 during the software verification process. In addition, test device 16 can provide operational inputs, such as communicative (e.g., analog, digital, or both) and/or electrical discrete inputs to aircraft electronic device 12 to place aircraft electronic device 12 in an operational state specified by, e.g., test procedures defined by ATG 22. For instance, test device 16 can provide aircraft system-level inputs, such as aircraft-on-ground (AOG) inputs, engine operating condition inputs, or other aircraft system-level inputs. In some examples, test device 16 can provide inputs to sensors of aircraft electronic device 12 to simulate a specified operational state of aircraft electronic device 12. For instance, in examples where aircraft electronic device 12 is (or includes) a pitot static pressure sensor, test device 16 can provide pressurized air at a specified pneumatic pressure to pressure sensors of aircraft electronic device 12 to simulate a specified airspeed, altitude, or other operational condition of aircraft electronic device 12.

As illustrated in FIG. 1, test device 16 is communicatively coupled with emulator 18. Emulator 18 can be, e.g., an in-circuit emulator or in-circuit debugger that emulates a processor of aircraft electronic device 12 and supports software debugging operations, such as halting and resuming software execution via breakpoints, memory display and monitoring, direct memory access and control, or other software debugging operations. In certain examples, emulator 18 can replace operation of the processor of aircraft electronic device 12 during testing operations. For instance, execution of operational software of aircraft electronic device 12 can be performed on emulator 18 that communicates with computer-readable memory and/or other electrical components of aircraft electronic device 12. In other examples, execution of the operational software can be performed directly on the processor of aircraft electronic device 12, and emulator 18 can provide support for debugging operations through communication with the processor via, e.g., a Joint Test Action Group (JTAG) access port.

Computing device 14, as illustrated in FIG. 1, includes design model 20 and automatic test generator 22. Design model 20 is a model representation of operational software of aircraft electronic device 12 that can be used to support, e.g., the software development and verification processes. Model 20 is described using one or more identified graphical and/or textual modeling notations. Model 20 includes one or more functional modules representative of, e.g., subroutines, procedures, functions, methods, or other functional groupings that implement a software architecture that conforms to a defined set of design requirements. Model 20 can be used for direct analysis or behavioral evaluation of the software architecture during the software development process. In addition, design model 20 can be utilized by ATG 22 to identify data coupling (i.e., the dependence of a functional module on data not exclusively under the control of that module) and control coupling (i.e., the manner or degree by which one functional module influences the execution of another functional module) within design model 20.

ATG 22 identifies data coupling and control coupling between functional modules of design model 20 and generates test conditions configured to test whether the operational software of aircraft electronic device 12 satisfies (e.g., matches) the identified data and control coupling. For example, as is further described below, ATG 22 can parse a model file including syntactical notations describing design model 20 to identify the data coupling and control coupling between functional modules (e.g., functions, methods, procedures, subroutines, or other functional modules) of design model 20.

As illustrated in FIG. 1, computing device 14 is communicatively coupled with test device 16 via one or more wired or wireless network connections (or both) to transmit one or more test procedures and receive back results of test conditions generated by ATG 22 to test whether operational software of aircraft electronic device 12 satisfies the data coupling and control coupling identified by ATG 22 in design model 20. In other examples, computing device 14 may not be directly connected with test device 16. In such examples, test procedures implementing test conditions generated by ATG 22 and corresponding test results can be transferred between computing device 14 and test device 16 via portable memory storage devices, such as portable flash drives or other portable memory storage devices.

Test device 16 is communicatively coupled with emulator 18 to execute test procedures that implement test conditions defined by ATG 22 on operational software of aircraft electronic device 12. Emulator 18 is communicatively coupled with aircraft electronic device 12 to communicate with computer-readable memory, processor(s), and/or other electrical components of aircraft electronic device 12 during execution of the test procedures. Test device 16, as illustrated in FIG. 1, is operatively connected (e.g., communicatively connected, electrically connected, or both) with aircraft electronic device 12 to supply electrical power and/or operational inputs and to monitor operational outputs of aircraft electrical device 12 during execution of the test procedures.

In operation, ATG 22 identifies data coupling and control coupling between functional modules of design model 20. For example, ATG 22 can parse a model file of design model 20 that includes syntactical notations describing design model 20. ATG 22 can identify syntactical representations of control coupling corresponding to function calls, method calls, subroutine calls, or other control couplings between functional modules of design model 20. ATG 22 identifies both the calling module and the called module to identify the control coupling (i.e., as the coupling between the calling and called module). ATG 22 can identify tens, hundreds, thousands, or more control couplings of design model 20. In addition, ATG 22 identifies data coupling between functional modules (e.g., tens, hundreds, thousands, or more data couplings) corresponding to data exchanged between functional modules of design model 20. For instance, data coupling can correspond to parameters passed with functions corresponding to identified control couplings. In other examples, data coupling can correspond to global data used or modified by two or more functional modules.

ATG 22 generates test conditions configured to test whether data coupling and control coupling of the operational software of aircraft electronic device 12 satisfies (e.g., matches) the identified data coupling and control coupling between functional modules of design model 20. For example, ATG 22 can identify a control coupling in design model 20 corresponding to a function call from a first function to a second function. ATG 22 can generate a test condition that tests whether the first function calls the second function in the operational software of aircraft electronic device 12, as is further described below. Similarly, ATG 22 can generate a test condition that tests whether identified data coupling associated with the control coupling (e.g., parameters passed from the first function to the second function during the function call) is satisfied. ATG 22 generates test conditions that test each of the identified data couplings and each of the identified control couplings between functional modules of design model 20.

ATG 22 further generates one or more test procedures that implement the generated test conditions. For example, ATG 22 can generate a test script that includes an order of implementation of the test procedures, expected results for each test condition, operational inputs corresponding to each test condition, or other information corresponding to the implementation of the test conditions. In some examples, generation of the test procedures that implement the generated test conditions can be manual in nature (e.g., by an engineer or other technician). Computing device 14 transmits the one or more test procedures generated by ATG 22 to test device 16 for execution on operational software of aircraft electronic device 12.

Test device 16 executes the one or more test procedures on operational software of aircraft electronic device 12 via emulator 18 and, in some examples, provides operational inputs to aircraft electronic device 12 via direct connection between test device 16 and aircraft electronic device 12. For example, test device 16 can set breakpoints that halt execution of the operational software at lines of the operational software corresponding to the identified control couplings and data couplings. Test device 16 can determine whether the operational software of aircraft electronic device 12 satisfies the test conditions while the execution of the operational software is halted (i.e., at the breakpoint), and can resume execution of the operational software after determining whether the operational software satisfies a respective test condition (e.g., by removing the breakpoint). Test device 16 can transmit and/or record, for each test condition, an indication of whether the operational software of aircraft electronic device 12 satisfies the respective test condition. Test device 16 outputs (e.g., transmits) the indications of whether the operational software of aircraft electronic device 12 satisfies the test conditions, such as by transmitting the indications to computing device 14 as test results.

Accordingly, system 10 implementing techniques of this disclosure can programmatically identify data coupling and design coupling between functional modules of design model 20 of operational software of aircraft electronic device 12. ATG 22, executing on computing device 14, generates test procedures implementing test conditions configured to test whether the operational software of aircraft electronic device 12 satisfies (e.g., matches) the identified data and control coupling of design model 20. As such, the techniques described herein can decrease both the time and cost associated with verification testing of data coupling and control coupling between design model 20 and operational software of aircraft electronic device 12. In addition, the systematic and programmatic approach to generating the test conditions and procedures can decrease the incidence of human error during the identification and codification of the test conditions and procedures as well as help to ensure that complete test coverage of the data and control coupling is achieved.

Figure 2:
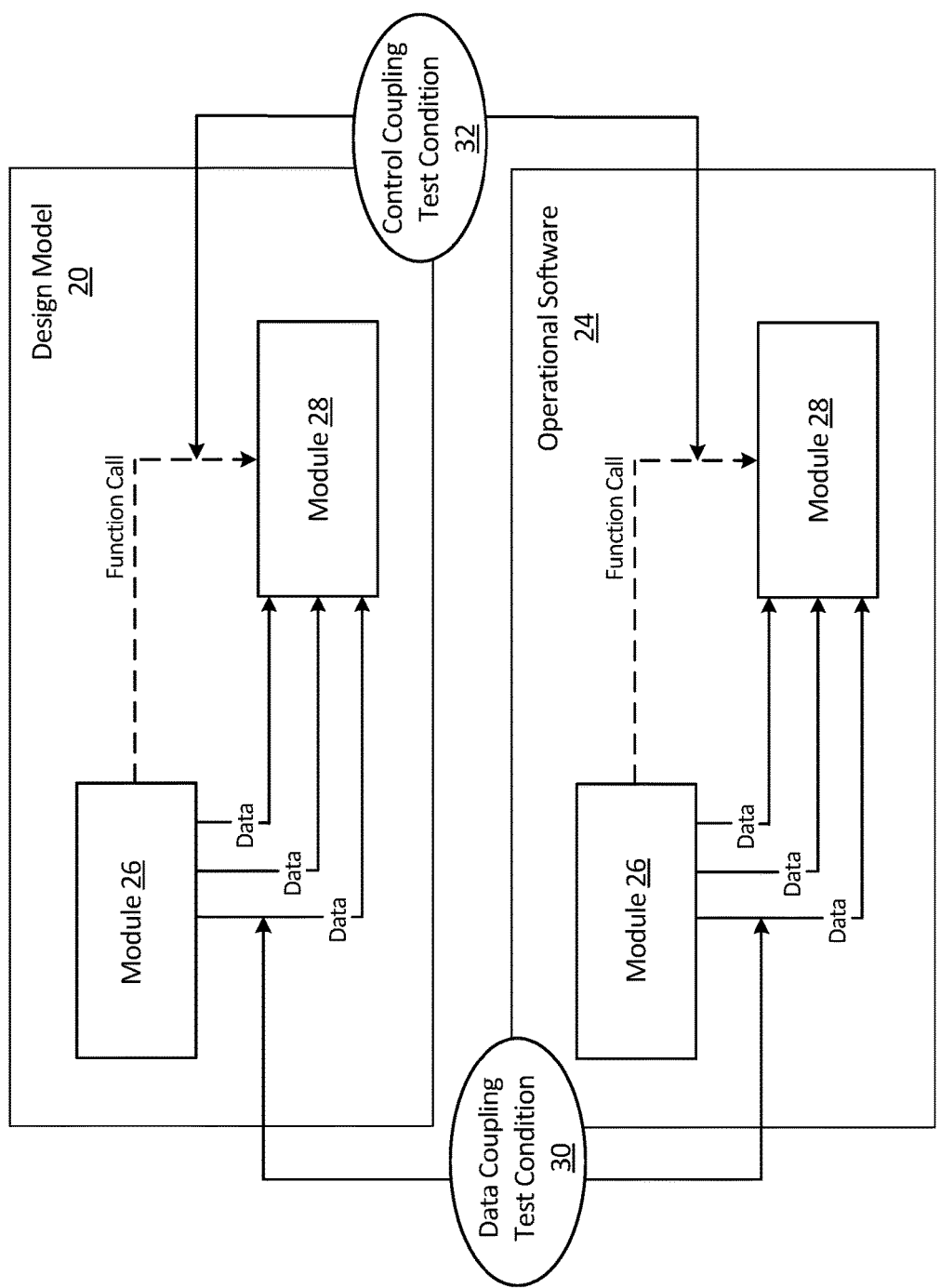
FIG. 2 is a schematic block diagram illustrating example test conditions configured to test whether operational software of an aircraft electronic device satisfies design model data coupling and design model control coupling.

FIG. 2 is a schematic block diagram illustrating example test conditions configured to test whether operational software 24 of aircraft electronic device 12 satisfies data coupling and control coupling between functional modules of design model 20. As illustrated in FIG. 2, design model 20 can include functional module 26 and functional module 28. Each of functional module 26 and functional module 28 correspond to functional groupings of operations, such as software functions, subroutines, procedures, or other functional groupings. As illustrated in FIG. 2, operational software 24 also includes functional module 26 and functional module 28. That is, each of design model 20 and operational software 24 include operational groupings corresponding to functional module 26 and functional module 28, though functional module 26 and functional module 28 can be implemented using different syntactical notations between design model 20 and operational software 24. In addition, while illustrated and described as including two functional modules 26 and 28, it should be understood that design model 20 and operational software 24 can include more than two functional modules, such as tens, hundreds, thousands, or more functional modules, each having multiple control couplings and data couplings in some examples.

In operation, ATG 22 (illustrated in FIG. 1) parses a model file of design model 20 to identify a control coupling corresponding to a function call from functional module 26 to functional module 28 in design model 20. ATG 22 further identifies data couplings corresponding to data passed (e.g., as function parameters) from functional module 26 to functional module 28. In response, ATG 22 generates data coupling test condition 30 configured to test whether operational software 24 satisfies the identified data coupling between functional module 26 and functional module 28. In addition, ATG 22 generates control coupling test condition 32 configured to test whether operational software 24 satisfies the identified control coupling between functional module 26 and functional module 28. For example, control coupling test condition 32 can specify a name, address, or other unique identifier of each of functional module 26 and functional module 28 and an expected function call of functional module 28 by functional module 26. Test device 16 (illustrated in FIG. 1) can search operational software 24 to identify an address, line, or other location of functional module 26 and set a breakpoint at a line or other location corresponding to a function call from functional module 26 to functional module 28 (or within functional module 26) to ensure that functional module 28 is called from functional module 26 as specified in control coupling test condition 32. In some examples, such as when operational software 24 is automatically generated from design model 20 (e.g., using an automatic code generation tool), modeling tools of design model 20 can identify corresponding addresses, lines, or locations of function module 26 corresponding to the expected function call of functional module 28 by functional module 26. Test device 16 can output an indication (e.g., by writing to a file, transmitting a communication message, or other indication) that control coupling test condition 32 is satisfied (i.e., passed) in response to determining that functional module 28 is called from functional module 26. Test device 16 can output an indication that control coupling test condition 32 is not satisfied (i.e., failed) in response to determining that functional module 28 is not called from functional module 26.

As further illustrated in FIG. 2, ATG 22 can generate data coupling test condition 30 that is configured to test whether data coupling identified within design model 20 between functional module 26 and functional module 28 is satisfied by (e.g., matches) data coupling between functional module 26 and functional module 28 within operational software 24. For instance, data coupling test condition 30 can specify a name, address, or other unique identifier of data passes between functional module 26 and functional module 28 (e.g., as parameters of a function call from functional module 26 to functional module 28). Test device 16 can search operational software 24 to identify an address, line, or other location of functional module 26 and set a breakpoint at a line or other location corresponding to a function call from functional module 26 to functional module 28 (or within functional module 26) to ensure that data specified in data coupling test condition 30 is passed between functional module 26 and functional module 28. Test device 16 can output an indication (e.g., by writing to a file, transmitting a communication message, or other indication) that data coupling test condition 30 is satisfied (i.e., passed) in response to determining that the data specified in data coupling test condition 30 is exchanged between functional module 26 and functional module 28. Test device 16 can output an indication that data coupling test condition 30 is not satisfied (i.e., failed) in response to determining that the data specified in data coupling test condition 30 is not exchanged between functional module 26 and functional module 28. In some examples, data coupling test condition 30 and control coupling test condition 32 can be expressed as a single test condition configured to test whether operational software 24 satisfies both the data coupling and control coupling between functional module 26 and functional module 28. ATG 22 can generate multiple data coupling and control coupling test conditions (i.e., for each identified data coupling and control coupling within design model 20) to test whether operational software 24 satisfies each of the control couplings and data couplings identified by ATG 22 within design model 20. Accordingly, ATG 22 can help to decrease the time and expense associated with manual identification of data and control couplings as well as the associated efforts to codify and execute the corresponding test conditions.

Figure 3:
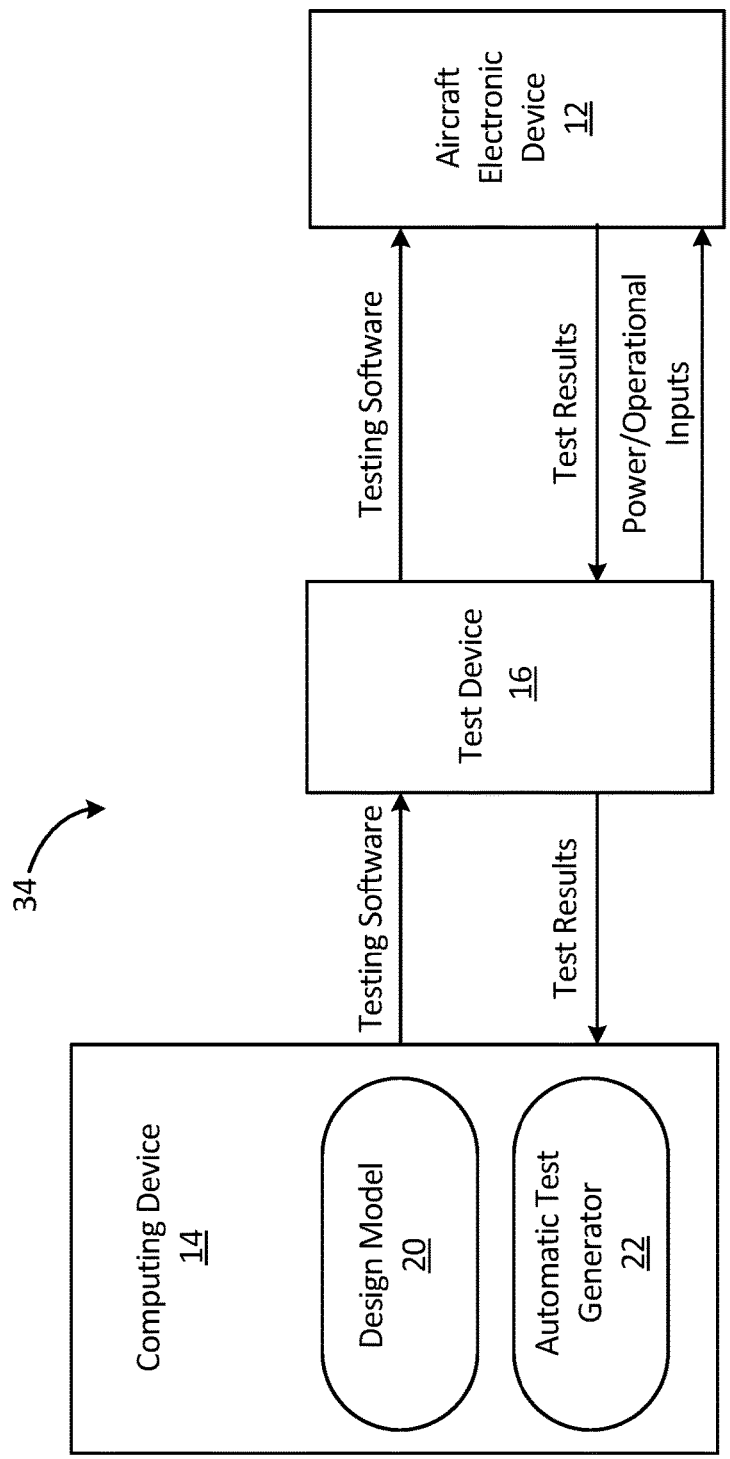
FIG. 3 is a schematic block diagram of another example system that generates test conditions configured to test whether operational software of an aircraft electronic device satisfies design model data coupling and design model control coupling.

FIG. 3 is a schematic block diagram of example system 34 that generates test conditions configured to test whether operational software of aircraft electronic device 12 satisfies design model data coupling and design model control coupling. System 34 illustrated in FIG. 3 is similar to system 10 of FIG. 1, and like reference numbers are utilized to illustrate like components. As illustrated in FIG. 3, system 34 does not include emulator 18 (FIG. 1). Rather, in the example of FIG. 3, system 34 utilizes testing software generated by ATG 22 that represents a modified version of the operational software of aircraft electronic device 12 to implement test procedures configured to test whether the operational software of aircraft electronic device 12 satisfies data coupling and control coupling identified by ATG 22 within design model 20. That is, in the example of FIG. 3, ATG 22 identifies data coupling and control coupling within design model 20 and, rather than generate test procedures that are executed by test device 16 via emulator 18 (e.g., using breakpoints and/or other software debugging operations), ATG 22 modifies the operational software of aircraft electronic device 12 to implement the test procedures and output the test results via a communicative connection with, e.g., test device 16.

ATG 22 can modify the operational software of aircraft electronic device 12 to implement the test procedures by, e.g., inserting testing code into the operational software that tests whether identified data coupling and control coupling is satisfied and outputs the corresponding test results via a communication message or to a file that is output via a communicative connection with one or more of test device 16 and computing device 14. In operation, computing device 14 transmits the modified testing software to test device 16, which loads the modified testing software into aircraft electronic device 12 (e.g., via a wired or wireless connection) for execution on one or more processors of aircraft electronic device 12. Aircraft electronic device 12 executes the modified testing software that implements the test conditions generated by ATG 22. Aircraft electronic device 12, according to the modified testing software, outputs test results including an indication, for each test condition, of whether the modified operational software of aircraft electronic device 12 satisfies the respective test condition. Test device 16 transmits the test results received from aircraft electronic device 12 to computing device 14 for analysis by, e.g., a software engineer, technician, certification authority, or other entity. In some examples, test device 16 can output (e.g., display) the test results and/or the test results can be retrieved manually via an output device (e.g., universal serial bus drive or other output device) of test device 16. In such examples, test results received from aircraft electronic device 12 need not be transmitted by test device 16 to computing device 14, but can be in some examples.

Figure 4:
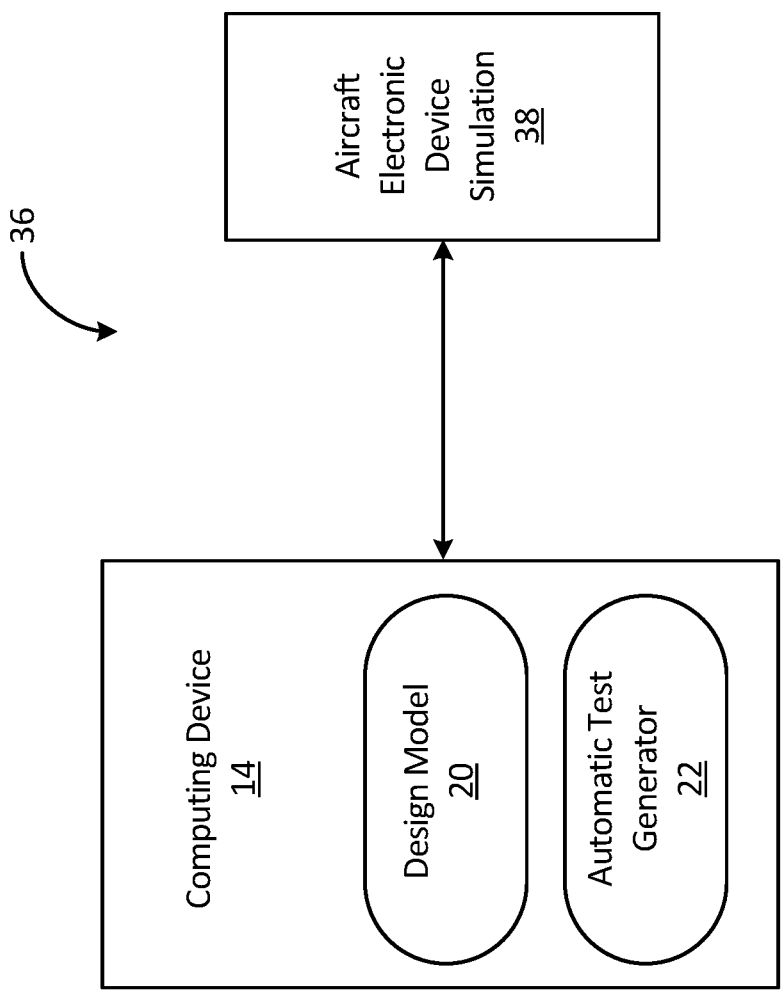
FIG. 4 is a schematic block diagram of another example system that generates test conditions configured to test whether operational software of an aircraft electronic device satisfies design model data coupling and design model control coupling.

FIG. 4 is a schematic block diagram of example system 36 that generates test conditions configured to test whether operational software of an aircraft electronic device implemented by aircraft electronic device simulation 38 satisfies design model data coupling and design model control coupling. System 36 illustrated in FIG. 4 is similar to system 10 of FIG. 1 and system 34 of FIG. 3, and like reference numbers are utilized to illustrate like components. As illustrated in FIG. 4, system 36 does not include test device 16 and aircraft electronic device 12. Rather, in the example of FIG. 4, system 36 utilizes aircraft electronic device simulation 38 that implements operational software of the aircraft electronic device (e.g., aircraft electronic device 12). Aircraft electronic device simulation 38 can include any combination of software and/or hardware components to simulate functional operation of aircraft electronic device 12. For instance, aircraft electronic device simulation 38 can include software components to simulate functionality of hardware components of aircraft electronic device 12 (e.g., communication ports, on-board memory, or other hardware components) to enable implementation of operational software of aircraft electronic device 12 by aircraft electronic device simulation 38.

Aircraft electronic device simulation 38 can be, in some examples, implemented by (e.g., executed on) computing device 14. In other examples, aircraft electronic device simulation 38 can be implemented by a separate computing device, such as a computing device in communication with computing device 14 via one or more wired and/or wireless communication networks.

In operation, ATG 22 identifies data coupling and control coupling within design model 20. ATG 22 generates a plurality of test conditions configured to test whether the operational software of aircraft electronic device 12 implemented by aircraft electronic device simulation 38 satisfies the design model data coupling and the design model control coupling. ATG 22, in some examples, executes a test procedure (e.g., generated by ATG 22 or otherwise generated) that implements the plurality of test conditions on the operational software implemented by aircraft electronic device simulation 38. In certain examples, such as when aircraft electronic device simulation 38 is implemented by a computing device that is remote from computing device 14, ATG 22 can transmit the test procedure and/or test conditions to the remote computing device that executes the test procedure and/or test conditions using aircraft electronic device simulation 38.

Accordingly, techniques of this disclosure enable automatic (e.g., programmatic) identification of data coupling and control coupling within design model 20 that is described using one or more identified graphical and/or textual modeling notations to represent operational software of aircraft electronic device 12. Moreover, techniques described herein enable the automatic generation of test conditions configured to test whether the operational software of aircraft electronic device 12 satisfies (e.g., matches) the identified data coupling and control coupling of design model 20. As such, the techniques can decrease the time and expense associated with software verification operations to determine whether operational software of aircraft electronic device 12 matches data coupling and control coupling of design model 20

The following are non-exclusive descriptions of possible embodiments of the present invention.

A method includes parsing, by an automatic test generator (ATG), a computer-executable design model of operational software of an aircraft electronic device to identify design model data coupling and design model control coupling between functional modules of the design model. The method further includes generating, by the ATG, a plurality of test conditions configured to test whether the operational software of the aircraft electronic device satisfies the design model data coupling and the design model control coupling, and generating a test procedure that implements the plurality of test conditions. The method further includes executing the test procedure on the operational software of the aircraft electronic device, and outputting, for each of the plurality of test conditions, an indication of whether the operational software of the aircraft electronic device satisfies the respective test condition.

The method of the preceding paragraph can optionally include, additionally and/or alternatively, any one or more of the following features, configurations, operations, and/or additional components:

Identifying the design model data coupling can include identifying data exchanged between each of the functional modules of the design model.

Identifying the design model control coupling can include identifying interdependence of the functional modules of the design model.

Identifying the interdependence of the functional modules of the design model can include identifying interdependence of calling and called functions of the design model.

Executing the test procedure on the operational software of the aircraft electronic device can include executing the operational software on an in-circuit emulator device in communication with the aircraft electronic device.

Executing the test procedure on the operational software of the aircraft electronic device can include executing the operational software on a processor of the aircraft electronic device.

Executing the test procedure on the operational software of the aircraft electronic device can include: halting, for each of the plurality of test conditions, execution of the operational software; determining, while the execution of the operational software is halted, whether the operational software satisfies the respective test condition; and resuming execution of the operational software after determining whether the operational software satisfies the respective test condition.

Halting the execution of the operational software can include setting a breakpoint at a line within the operational software that causes the operational software to halt during execution of the line. Resuming the execution of the operational software can include removing the breakpoint.

Generating the test procedure that implements the plurality of test conditions can include modifying the operational software of the aircraft electronic device to implement the plurality of test conditions.

Parsing the computer-executable design model of the operational software of the aircraft electronic device can include parsing a model file of the design model to identify syntactical representations of the design model data coupling and the design model control coupling between the functional modules of the design model.

A system includes an aircraft electronic device, a computing device, and a test device in communication with the aircraft electronic device and the computing device. The computing device includes at least one processor and computer-readable memory. The computer-readable memory of the computing device is encoded with instructions that, when executed by the at least one processor, cause the computing device to execute an automatic test generator (ATG) that is configured to parse a computer-executable design model of operational software of the aircraft electronic device to identify design model data coupling and design model control coupling between functional modules of the design model. The ATG is further configured to generate a plurality of test conditions configured to test whether the operational software of the aircraft electronic device satisfies the design model data coupling and the design model control coupling. The test device is configured to execute a test procedure that implements the plurality of test conditions on the operational software of the aircraft electronic device, and output, for each of the plurality of test conditions, an indication of whether the operational software of the electronic device satisfies the respective test condition.

The system of the preceding paragraph can optionally include, additionally and/or alternatively, any one or more of the following features, configurations, operations, and/or additional components:

The ATG can be further configured to identify the design model data coupling by at least being configured to identify data exchanged between each of the functional modules of the design model.

The ATG can be further configured to identify the design model control coupling by at least being configured to identify interdependence of the functional modules of the design model.

The ATG can be configured to identify interdependence of the functional modules of the design model by at least being configured to identify interdependence of calling and called functions of the design model.

The system can further include an in-circuit emulator device in communication with the test device and the aircraft electronic device. The in-circuit emulator device can be configured to execute the operational software of the aircraft electronic device. The test device can be configured to execute the test procedure on the operational software of the aircraft electronic device executing on the in-circuit emulator device.

The test device can be configured to execute the test procedure on the operational software of the aircraft electronic device executing on a processor of the aircraft electronic device.

The test device can be configured to execute the test procedure on the operational software of the aircraft electronic device by at least being configured to: halt, for each of the plurality of test conditions, execution of the operational software; determine, while the execution of the operational software is halted, whether the operational software satisfies the respective test condition; and resume execution of the operational software after determining whether the operational software satisfies the respective test condition.

The test device can be configured to halt the execution of the operational software by at least being configured to set a breakpoint at a line within the operational software that causes the operational software to halt during execution of the line. The test device can be configured to resume the execution of the operational software by at least being configured to remove the breakpoint.

The ATG can be configured to generate the test procedure that implements the plurality of test conditions by at least being configured to modify the operational software of the aircraft electronic device to implement the plurality of test conditions.

The ATG can be configured to parse the computer-executable design model of the operational software of the aircraft electronic device by at least being configured to parse a model file of the design model to identify syntactical representations of the design model data coupling and the design model control coupling between the functional modules of the design model.

A system includes one or more processors and computer-readable memory. The computer-readable memory is encoded with instructions that, when executed by the at least one processor, cause the system to execute an automatic test generator (ATG) configured to: parse a computer-executable design model of operational software of an aircraft electronic device to identify design model data coupling and design model control coupling between functional modules of the design model; generate a plurality of test conditions configured to test whether the operational software of the aircraft electronic device satisfies the design model data coupling and the design model control coupling; and execute a test procedure that implements the plurality of test conditions on the operational software of the aircraft electronic device.

The system of the preceding paragraph can optionally include, additionally and/or alternatively, any one or more of the following features, configurations, operations, and/or additional components:

The operational software of the aircraft electronic device can be implemented by a simulation of the aircraft electronic device.

The ATG and the simulation of the aircraft electronic device can be implemented by a same computing device.

The ATG can be implemented by a first computing device. The simulation of the aircraft electronic device can be implemented by a second computing device.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method comprising:
   parsing, by an automatic test generator (ATG), a model file including syntactical notations describing a computer-executable design model of operational software of an aircraft electronic device;
   wherein parsing comprises:
      identifying one or more design model control coupling data, corresponding to calls between functional modules of the design model using the syntactical representation of interdependence of the function modules of the design model;
      identifying one or more design model data coupling, comprising data exchanged between each of the functional modules of the design model;
   automatically generating, by the ATG, a plurality of test conditions, wherein for each of the identified one or more design model control coupling data and identified one or more design model data coupling, a respective test condition is generated to test whether the operational software of the aircraft electronic device satisfies the design model data coupling or the design model control coupling identified;

generating a test procedure that implements the plurality of test conditions;

executing the test procedure on the operational software of the aircraft electronic device;

wherein executing the test procedure on the operational software of the aircraft electronic device comprises:

halting, for each of the plurality of test conditions, execution of the operational software;

determining, while the execution of the operational software is halted, whether the operational software satisfies the respective test condition; and resuming execution of the operational software after determining whether the operational software satisfies the respective test condition; and outputting, for each of the plurality of test conditions, an indication of whether the operational software of the aircraft electronic device satisfies the respective test condition.

2. The method of claim 1, wherein identifying the interdependence of the functional modules of the design model comprises identifying interdependence of calling and called functions of the design model.

3. The method of claim 1, wherein executing the test procedure on the operational software of the aircraft electronic device comprises executing the operational software on one of an in-circuit emulator device or in-circuit debugger device in communication with the aircraft electronic device.

4. The method of claim 1, wherein executing the test procedure on the operational software of the aircraft electronic device comprises executing the operational software on a processor of the aircraft electronic device.

5. The method of claim 1, wherein generating the test procedure that implements the plurality of test conditions comprises modifying the operational software of the aircraft electronic device to implement the plurality of test conditions.

6. A system comprising:

an aircraft electronic device;

a computing device comprising at least one processor and computer-readable memory encoded with instructions that, when executed by the at least one processor, cause the computing device to execute an automatic test generator (ATG) configured to:

parsing a model file including syntactical notations describing a computer-executable design model of operational software of the aircraft electronic device to identify one or more design model control coupling data, corresponding to calls between functional modules of the design model using the syntactical representation of interdependence of the functional modules of the design model and to identify one or more design model data coupling, comprising data exchanged between each of the functional models of the design model;

automatically generating a plurality of test conditions, wherein for each of the identified one or more design model control coupling data and identified one or more design model data coupling, a respective test condition is generated to test whether the operational software of the aircraft electronic device satisfies the design model data coupling or the design model control coupling identified;

generating a test procedure that implements the plurality of test conditions; and a test device in communication with the aircraft electronic device and the computing device, the test device configured to:

execute the test procedure on the operational software of the aircraft electronic device;

wherein executing the test procedure on the operational software of the aircraft electronic device comprises:

halting, for each of the plurality of test conditions, execution of the operational software;

determining, while the execution of the operational software is halted, whether the operational software satisfies the respective test condition;

resuming execution of the operational software after determining whether the operational software satisfies the respective test condition; and outputting, for each of the plurality of test conditions, an indication of whether the operational software of the electronic device satisfies the respective test condition.

7. The system of claim 6, wherein the ATG is configured to identify interdependence of the functional modules of the design model by at least being configured to identify interdependence of calling and called functions of the design model.

8. The system of claim 6, further comprising:

an in-circuit emulator device in communication with the test device and the aircraft electronic device, the in-circuit emulator device configured to execute the operational software of the aircraft electronic device;

wherein the test device is configured to execute the test procedure on the operational software of the aircraft electronic device executing on the in-circuit emulator device.

9. The system of claim 6, wherein the test device is configured to execute the test procedure on the operational software of the aircraft electronic device executing on a processor of the aircraft electronic device.

10. The system of claim 6, wherein the ATG is configured to generate the test procedure that implements the plurality of test conditions by at least being configured to modify the operational software of the aircraft electronic device to implement the plurality of test conditions.

11. A non-transitory computer-readable memory encoded with instructions that cause the system to execute an automatic test generator (ATG) configured to perform the steps of:

parsing a model file including syntactical notations describing a computer-executable design model of operational software of the aircraft electronic device to identify one or more design model control coupling data, corresponding to calls between functional modules of the design model using the syntactical representation of interdependence of the functional modules of the design model and to identify one or more design model data coupling, comprising data exchanged between each of the functional models of the design model;

automatically generating a plurality of test conditions, wherein for each of the identified one or more design model control coupling data and identified one or more design model data coupling, a respective test condition is generated to test whether the operational software of the aircraft electronic device satisfies the design model data coupling or the design model control coupling identified;

generating a test procedure that implements the plurality of test conditions; and execute the test procedure on the operational software of the aircraft electronic device;

wherein executing the test procedure on the operational software of the aircraft electronic device comprises:

halting, for each of the plurality of test conditions, execution of the operational software;

determining, while the execution of the operational software is halted, whether the operational software satisfies the respective test condition;

resuming execution of the operational software after determining whether the operational software satisfies the respective test condition; and outputting, for each of the plurality of test conditions, an indication of whether the operational software of the electronic device satisfies the respective test condition.

12. The non-transitory computer-readable memory of claim 11, wherein the operational software of the aircraft electronic device is implemented by a simulation of the aircraft electronic device.

13. The non-transitory computer-readable memory of claim 12, wherein the ATG and the simulation of the aircraft electronic device are implemented by a same computing device.

14. The non-transitory computer-readable memory of claim 12, wherein the ATG is implemented by a first computing device; and wherein the simulation of the aircraft electronic device is implemented by a second computing device.

\* \* \* \* \*